United States Patent Office 2,819,291
Patented Jan. 7, 1958.

2,819,291

HALOGENATED NITRILES

Samuel Allen Heininger, Dayton, Ohio, assignor to Monsanto Chemical Company, St. Louis, Mo., a corporation of Delaware No Drawing. Application June 25, 1956
Serial No. 593,314

3 Claims. (Cl. 260—465)

This invention relates to halogenated nitriles and more particularly provides di- and trihalophenoxypropionitriles wherein the halogen substituent is selected from chlorine and bromine.

This application is a continuation-in-part of copending application, S. N. 476,602, filed December 20, 1954, by Philip H. Santmyer and Samuel Allen Heininger.

The present compounds may be prepared by the addition of a halophenol to acrylonitrile, as illustrated by the following equation:

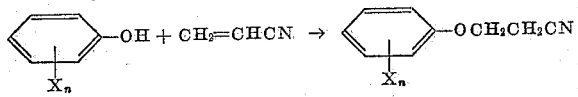

where $x$ represents a halogen atom having a molecular weight of from 30 to 80, i. e., bromine or chlorine and $n$ represents an integer of from 2 to 3. Alternatively, a polyhalophenol may be reacted with a 3-halopropionitrile, with the formation of products of the above formula, and, as a byproduct, hydrogen chloride.

In preparing the present compounds from acrylonitrile, the desired polyhalophenol is contacted with the acrylonitrile at elevated temperatures in the presence of an alkaline catalyst and under superatmospheric pressure until formation of the desired halophenoxypropionitrile has occurred. As shown by the above equation, the desired product is formed by the stoichiometric addition of one mole of the halophenol to one mole of acrylonitrile; accordingly, the present reaction is preferably carried out by contacting equimolar quantities of each of the said reactants. If desired, an excess of the more readily available reaction component may be utilized. To catalyze the reaction, there is used an alkaline catalyst. Examples of such alkaline catalysts are, e. g., the alkali metals such as sodium or potassium; the oxides and hydroxides of alkali and alkaline earth metals such as sodium hydroxide; the alkali alcoholates such as sodium methylate or sodium ethylate; the alkali cyanides such as potassium cyanide, etc. Alternatively, in place of an alkaline salt of an alkali metal, an alkaline-reacting organic base such as an amine or, preferably, a quaternary ammonium hydroxide compound may be used. Examples of suitable quaternary ammonium hydroxides are choline (trimethyl(hydroxyethyl)ammonium hydroxide), Triton B (benzyltrimethylammonium hydroxide), acetylbenzyldimethylammonium hydroxide, octadecyldiethylmethylammonium hydroxide, etc. Preferably, the alkaline catalyst used in the present reaction is one which is soluble in organic solvents.

If desired, solvents or diluents may be used in the reaction mixture, although it is preferred to dispense with such diluents in the present reaction so as to avoid problems of concentration of the desired product. Examples of suitable diluents which may be used when desired are liquid organic compounds which are free of active hydrogen such as dioxane, benzene, hexane, etc. The reaction mixture may also contain a polymerization inhibitor, to obviate the possibility of producing acrylonitrile polymer during the reaction. Examples of such inhibitors are, e. g., hydroquinone, the monomethyl ether of hydroquinone, methylene blue, etc.

To produce useful yields of the present reaction products within feasible reaction times, the present reaction of acrylonitrile with a polyhalophenol should be carried out at elevated temperatures. In order to maintain the present reactants in contact at elevated temperatures, it is generally necessary to apply superatmospheric pressure. Conveniently, the present reaction is carried out by contacting the reactants at elevated temperatures in a closed pressure-resistant reaction vessel, under the autogenous pressure of the reactants. If desired, inert gases may be introduced to increase the pressure within the reaction locus; examples of such gases are nitrogen, carbon dioxide, etc. The reaction temperatures at which the present reaction proceeds at a desirable rate are of the order of from 100° C. up to below the decomposition temperatures of the reactants. Particularly preferable are temperatures of from 100° to 200° C.

While batch operations are described in the following examples, with suitable choice of apparatus it is possible to operate the present process continuously, and thereby yields up to quantitative yields may be obtained. Thus, e. g., the halophenol and acrylonitrile may be injected into a heated tubular reactor wherein a superatmospheric pressure is maintained, the produce halophenoxypropionitrile being isolated from the resulting reaction product, while unreacted acrylonitrile and halophenol are recycled to undergo further reaction.

In an alternative procedure for the synthesis of the present products, a polyhalophenol of the above formula is contacted with a 3-halopropionitrile. In this procedure, generally equimolar quantities of halophenol and halopropionitrile are contacted, preferably in the presence of an equimolar quantity of an alkali metal hydroxide. Advantageously, provision is made in carrying out this reaction for the removal of the hydrogen halide formed as byproduct; thus the alkaline material present, e. g., sodium hydroxide, may also act as a hydrogen halide acceptor. Suitable alkaline catalysts and solvents or diluents for this reaction are as listed above. The reaction of a halophenol or an alkali halophenolate with a halopropionitrile proceeds readily over a wide temperature range, and practicable reaction rates are generally achieved at relatively low temperatures, e. g., at about 50–100° C., with this reaction. Pressure variation is generally unnecessary, although sub- or superatmospheric pressures may be employed if desired.

Illustrative of the compounds which may be prepared by the present process are, e. g., 2,4-dichlorophenoxypropionitrile, 3,4-dichlorophenoxypropionitrile, 2,4,5-trichlorophenoxypropionitrile, 2,6-dichlorophenoxypropionitrile, 2,4,6 - trichlorophenoxypropionitrile, 2,4 - dibromo - phenoxypropionitrile, 2,4,5-tribromophenoxypropionitrile, 3,5-dichlorophenoxypropionitrile, 2-chloro-4-bromophenoxypropionitrile, etc.

The present compounds are for the most part solid crystalline materials having a relatively low melting point, below 100° C. They may be used for a variety of chemical and industrial purposes. Thus, for example, the use of the present compounds as nematocides is disclosed in aforementioned copending application Serial No. 476,602, filed December 20, 1954. I have also discovered that the present compounds possess useful fungicidal, arachnicidal, and phytocidal properties. In particular, it has been found that the present polyhalophenols unexpectedly possess fungicidal properties as a foliage protectant which are not shared by the monohalogenated compounds of similar structure. Furthermore, the compounds of the invention may be used as dielectrics, and may be converted by hydrolysis and esterification to materials of potential utility as dielectrics and functional fluids.

The invention is illustrated but not limited by the following examples:

*Example 1*

A mixture of 489 g. (3.0 moles) of 2,4-dichlorophenol, 3 g. of sodium methylate and 160 g. (3.0 moles) of acrylonitrile was placed in a one-liter autoclave which was closed, heated to 150° C., and rocked for 12 hours. After acidification with concentrated hydrochloric acid, the reaction mixture was distilled: the unreacted acrylonitrile recovered in the distillation weighed 127 g.; recovered phenol weighed 400 g. The pot residue (boiling above 195°/0.5 mm. pot temperature) was treated with 300 ml. of ether and 200 ml. of 10% sodium hydroxide, and the mixture filtered to remove tar. The ether layer was separated and washed with 100 ml. of 10% sodium hydroxide solution and then washed three times with 100 ml. portions of water. After drying over sodium sulfate, the ether was evaporated off, whereby there were obtained 30 g. of 3-(2,4-dichlorophenoxy)propionitrile, M. 54–56° C. after recrystallization from an ethanol-water mixture.

*Example 2*

By refluxing a mixture of 200 g. (0.8 mole) of 2,4,-dibromophenol, 89.5 g. (1.0 mole) of 3-chloropropionitrile, and 200 ml. of 30% KOH for 4 hours, 3-(2,4-dibromophenoxy)propionitrile is prepared. This product, after isolation by distillation, may be identified by conversion to the corresponding acid, e. g., by hydrolyzing the nitrile with hydrochloric acid. 2,4-dibromophenoxypropionic acid melts at 115–116° C.

*Example 3*

Using the procedure of Example 2, by the reaction of 2,4,5-trichlorophenol with acrylonitrile there may be prepared 3-(2,4,5-trichlorophenoxy)propionitrile.

*Example 4*

This example describes the evaluation of 3-(2,4-dichlorophenoxy)propiontrile as a fungicide, and a comparison of the fungicidal properties thereof with those of 3-(2-chlorophenoxy)propionitrile and 3-(4-chlorophenoxy)propionitrile.

3-(4-chlorophenoxy)propionitrile was prepared by refluxing a mixture of 384 g. of p-chlorophenol with 212 g. (4.0 moles) of acrylonitrile containing 5 g. of hydroquinone in the presence of 3 g. of sodium methylate for 24 hours. The solution was cooled, neutralized with hydrochloric acid, and distilled; there were obtained 257 g. of 3-(4-chlorophenoxy)propionitrile, B. 125–128° C./0.2 mm., M. 45–46° C. (after recrystallization from ethanol). Similarly, 3-(2-chlorophenoxy)propionitrile was prepared by reacting 212 g. of acrylonitrile at reflux with 384 g. of o-chlorophenol in the presence of sodium methylate for approximately 24 hours; there were obtained 89 g. of 3-(2-chlorophenoxy)propionitrile, B. 111–113° C./0.25 mm., melting point after recrystallization, 46–47° C.

Emulsions of the 3-(2-chlorophenoxy)-, 3-(4-chlorophenoxy)-, and 3-(2,4-dichlorophenoxy)propionitriles synthesized as described above were prepared by mixing samples of acetone solutions of the propionitriles with an emulsifying agent known as "Tween 20" and reputed to be a polyalkylene glycol derivative of sorbitan monolaurate, and adding water thereto. The emulsions were sprayed on Bonny Best variety tomato plants which were about 3 to 5 inches tall and each had at least 4 true leaves. After being held two days on a greenhouse bench, the plants were placed in a moist chamber at 70° F. and sprayed with a spore suspension of *Stemphylium solani*, the fungus responsible for an important leaf blight disease of tomatoes. After 3 days incubation, the plants were removed to the greenhouse bench, where they were inspected 2 days later, the extent of infection of the plants being judged by counting leaf lesions, with reference to an inoculated, untreated control plant and to an inoculated plant treated with a commercial reference fungicide. It was found that substantially complete repression of the fungus infestation, equal to that obtained by application of the commercial reference fungicide, was obtained on the plants sprayed with an emulsion containing 625 parts per million of 3-(2,4-dichlorophenoxy)propionitrile. By contrast, leaf-spot equal to that of the untreated control was observed with tomato plants treated even with emulsions containing twice as high a concentration, 1250 parts per million, of either 3-(2-chlorophenoxy)- or 3,(4-chlorophenoxy)propiontrile.

While the invention has been illustrated with particular reference to various individual embodiments thereof, it will be obvious that other variations may be made within the scope of the present invention.

What is claimed is:

1. A polyhalophenoxypropionitrile of the formula

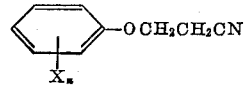

where X is a halogen atom having a molecular weight of from 30 to 80, and $n$ is an integer of from 2 to 3.

2. 3-(dichlorophenoxy)propionitriles.

3. 3-(2,4-dichlorophenoxy)propionitrile.

References Cited in the file of this patent

UNITED STATES PATENTS

| | | |
|---|---|---|
| 2,421,837 | Hardman | June 10, 1947 |
| 2,733,257 | Barber et al. | Jan. 31, 1956 |

FOREIGN PATENTS

| | | |
|---|---|---|
| 670,357 | Germany | Jan. 17, 1939 |

OTHER REFERENCES

Newman et al.: J. A. C. S., vol. 69, pp. 718–20 (1947).